(12) United States Patent
Ohgami et al.

(10) Patent No.: US 8,421,972 B2
(45) Date of Patent: Apr. 16, 2013

(54) LIQUID CRYSTAL DISPLAY DEVICE

(75) Inventors: Hiroyuki Ohgami, Osaka (JP); Yoshito Hashimoto, Osaka (JP); Masakazu Shibasaki, Osaka (JP); Yuichi Iyama, Osaka (JP); Masumi Kubo, Osaka (JP); Masayuki Soga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 244 days.

(21) Appl. No.: 12/740,224

(22) PCT Filed: Dec. 11, 2008

(86) PCT No.: PCT/JP2008/003722
§ 371 (c)(1),
(2), (4) Date: Apr. 28, 2010

(87) PCT Pub. No.: WO2009/084162
PCT Pub. Date: Jul. 9, 2009

(65) Prior Publication Data
US 2010/0253897 A1    Oct. 7, 2010

(30) Foreign Application Priority Data
Dec. 28, 2007    (JP) ................................. 2007-340854

(51) Int. Cl.
*G02F 1/1337*    (2006.01)
*G02F 1/1343*    (2006.01)

(52) U.S. Cl.
USPC ............ 349/130; 349/129; 349/141; 349/142

(58) Field of Classification Search .......... 349/129–130, 349/141
See application file for complete search history.

(56) References Cited

U.S. PATENT DOCUMENTS

| 6,940,575 B2 * | 9/2005 | Sunohara et al. ............. 349/142 |
| 6,943,860 B2 * | 9/2005 | Hong et al. .................... 349/139 |
| 7,113,241 B2 | 9/2006 | Hanaoka et al. |

(Continued)

FOREIGN PATENT DOCUMENTS

| EP | 2 224 283 A1 | 9/2010 |
| JP | 2004-77699 | 3/2004 |
| JP | 2007-249244 | 9/2007 |

OTHER PUBLICATIONS

English translation of the International Preliminary Report on Patentability mailed Aug. 19, 2010 in corresponding PCT Application No. PCT/JP2008/003722.

(Continued)

*Primary Examiner* — Edward Glick
*Assistant Examiner* — Dennis Y Kim
(74) *Attorney, Agent, or Firm* — Nixon & Vanderhye P.C.

(57) ABSTRACT

There is provided a liquid crystal display device of high picture quality with high brightness and small display unevenness.
A vertical alignment type liquid crystal display device which has a plurality of pixels includes: a first electrode which includes, in each of the plurality of pixels, a plurality of first branch portions extending in a first direction and a plurality of second branch portions extending in a second direction that is different from the first direction; a second electrode disposed so as to oppose the first electrode; and a liquid crystal layer interposed between the first electrode and the second electrode, wherein a width of each of the plurality of first branch portions and the plurality of second branch portions is in a range not less than 1.4 μm and not more than 8.0 μm.

12 Claims, 6 Drawing Sheets

U.S. PATENT DOCUMENTS

| | | |
|---|---|---|
| 7,145,622 B2 | 12/2006 | Kataoka et al. |
| 7,209,205 B2 | 4/2007 | Yoshida et al. |
| 2002/0159018 A1 | 10/2002 | Kataoka et al. |
| 2003/0043336 A1 | 3/2003 | Sasaki et al. |
| 2003/0086044 A1 | 5/2003 | Inoue et al. |
| 2003/0160750 A1 | 8/2003 | Ueda et al. |
| 2003/0193625 A1 | 10/2003 | Yoshida et al. |
| 2003/0197819 A1 | 10/2003 | Sunohara et al. |
| 2005/0253988 A1 | 11/2005 | Inoue et al. |
| 2006/0146243 A1 | 7/2006 | Nakanishi et al. |
| 2007/0103607 A1 | 5/2007 | Hanaoka et al. |
| 2009/0046233 A1* | 2/2009 | Cho et al. ............ 349/141 |
| 2011/0025970 A1 | 2/2011 | Hashimoto et al. |

OTHER PUBLICATIONS

International Search Report for PCT/JP2008/003722, mailed Jan. 27, 2009.

International Search Report for PCT/JP2008/003975, mailed Feb. 3, 2009.

English Translation of International Preliminary Report on Patentability mailed Sep. 27, 2010 and International Search Report for PCT/JP2008/003975, mailed Feb. 3, 2009.

* cited by examiner (a)     (b)     (c)

(a)　　　(b)　　　(c)

| L[μm] | S[μm] | | | | | | | | |
|---|---|---|---|---|---|---|---|---|---|
| | 1.4 | 1.8 | 2.1 | 2.5 | 2.8 | 3.2 | 3.5 | 4.2 | 5.0 |
| 1.4 | 84.0 | 91.9 | 94.1 | 93.8 | 95.1 | 83.5 | 73.1 | 60.7 | 44.4 |
| 1.8 | 86.4 | 93.8 | 97.0 | 95.8 | 96.8 | 85.9 | 74.1 | 61.7 | 45.9 |
| 2.1 | 85.4 | 95.1 | 97.5 | 98.8 | 96.3 | 84.4 | 75.6 | 62.5 | 50.9 |
| 2.5 | 89.4 | 95.8 | 97.8 | 100.0 | 97.5 | 87.9 | 81.5 | 64.2 | 52.6 |
| 2.8 | 88.9 | 94.3 | 97.0 | 96.3 | 93.6 | 87.2 | 80.7 | 63.5 | 51.6 |
| 3.2 | 86.9 | 93.3 | 94.8 | 96.8 | 94.1 | 87.2 | 79.5 | 63.0 | 51.9 |
| 3.5 | 84.7 | 90.9 | 93.6 | 94.3 | 94.8 | 86.7 | 77.3 | 63.5 | 50.6 |
| 4.2 | 82.5 | 88.6 | 92.3 | 94.3 | 95.8 | 89.1 | 80.2 | 66.7 | 54.6 |
| 5.0 | 79.5 | 88.9 | 93.3 | 92.6 | 94.1 | 86.9 | 79.0 | 65.7 | 52.1 |
| 6.0 | 76.5 | 85.9 | 91.9 | 92.8 | 92.6 | 86.2 | 81.0 | 62.7 | 50.6 |
| 8.0 | 72.6 | 83.2 | 92.6 | 91.4 | 90.9 | 83.5 | 78.8 | 63.7 | 49.4 |

FIG.8

| L[μm] | S[μm] | | | | | | | | |
|---|---|---|---|---|---|---|---|---|---|
| | 1.4 | 1.8 | 2.1 | 2.5 | 2.8 | 3.2 | 3.5 | 4.2 | 5.0 |
| 1.4 | ××(1) | ○ | ○ | ○ | ○ | ×(2) | ××(2) | ××(2) | ××(2) |
| 1.8 | ××(1) | ○ | ○ | ○ | ○ | ×(2) | ××(2) | ××(2) | ××(2) |
| 2.1 | ××(1) | ○ | ○ | ○ | ○ | ×(2) | ××(2) | ××(2) | ××(2) |
| 2.5 | ××(1) | ○ | ○ | ○ | ○ | ×(2) | ××(2) | ××(2) | ××(2) |
| 2.8 | ××(1) | ○ | ○ | ○ | ○ | ×(2) | ××(2) | ××(2) | ××(2) |
| 3.2 | ××(1) | ○ | ○ | ○ | ○ | ×(2) | ××(2) | ××(2) | ××(2) |
| 3.5 | ××(1) | ×(1) | ○ | ○ | ○ | ×(2) | ××(2) | ××(2) | ××(2) |
| 4.2 | ××(1) | ×(1) | ○ | ○ | ○ | ×(2) | ××(2) | ××(2) | ××(2) |
| 5.0 | ××(1) | ×(1) | ○ | ○ | ○ | ×(2) | ××(2) | ××(2) | ××(2) |
| 6.0 | ××(1) | ×(1) | ×(1) | ×(1) | ×(1) | ×(2) | ××(2) | ××(2) | ××(2) |
| 8.0 | ××(1) | ×(1) | ×(1) | ×(1) | ×(1) | ×(1) | ××(2) | ××(2) | ××(2) |

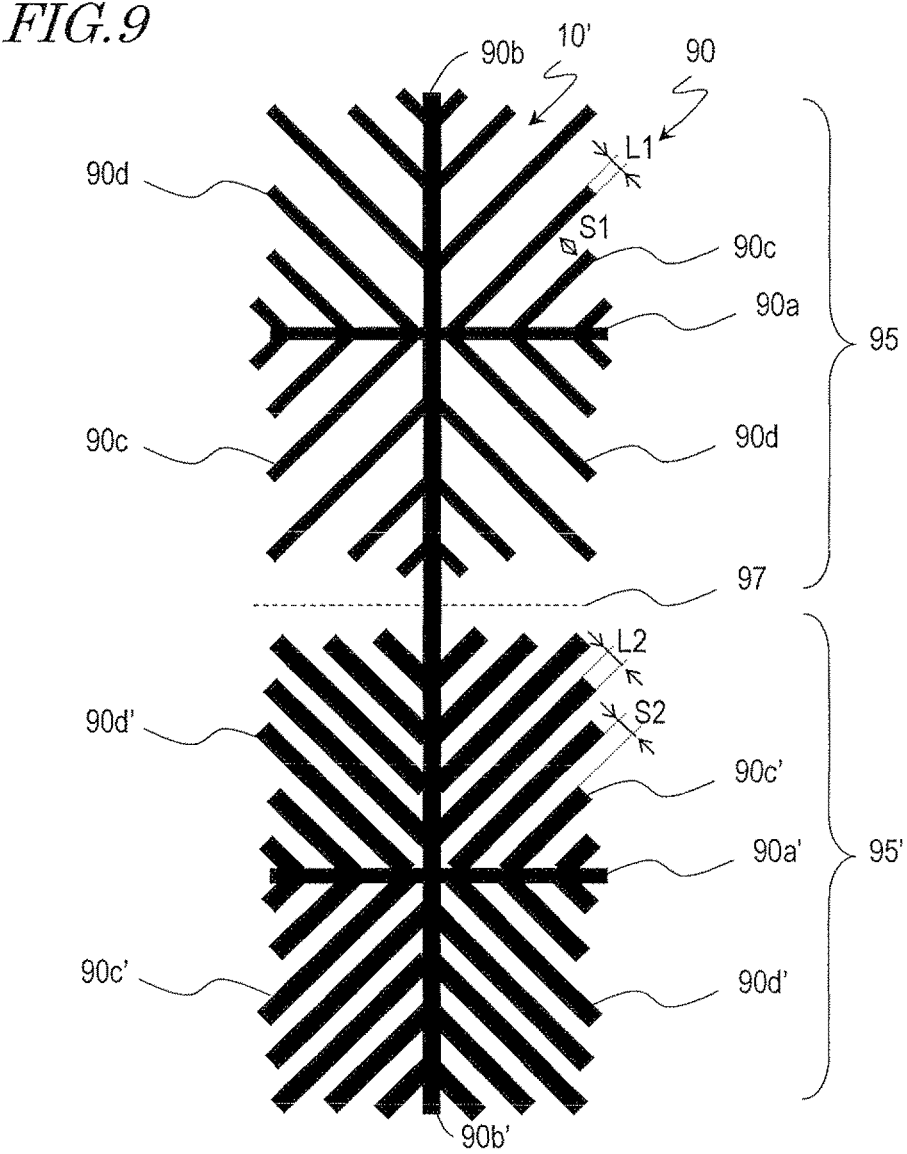

LIQUID CRYSTAL DISPLAY DEVICE

This application is the U.S. national phase of International Application No. PCT/JP2008/003722 filed 11 Dec. 2008 which designated the U.S. and claims priority to JP Patent Application No. 2007-340854 filed 28 Dec. 2007, the entire contents of each of which are hereby incorporated by reference.

TECHNICAL FIELD

The present invention relates to a liquid crystal display device and specifically to a vertical alignment type liquid crystal display device which has a plurality of divisional alignment regions in a pixel.

BACKGROUND AND SUMMARY OF THE INVENTION

As of now, liquid crystal display devices under development which have wide viewing angle characteristics includes liquid crystal display devices utilizing the IPS (In-Plane-Switching) mode which is a transverse electric field mode or the FFS (Fringe Field Switching) mode, and liquid crystal display devices utilizing the VA (Vertical Alignment) mode. The VA mode is better for mass production than the transverse electric field mode and is therefore used in a wide range of TV applications and mobile applications.

The VA mode liquid crystal display devices are generally classified into MVA (Multidomain Vertical Alignment) mode liquid crystal display devices, in which one pixel includes a plurality of domains of different liquid crystal alignment directions, and CPA (Continuous Pinwheel Alignment) mode liquid crystal display devices in which the liquid crystal alignment direction continuously varies around a rivet or the like formed on an electrode at the center of a pixel.

In the MVA mode liquid crystal display devices, the alignment control means which extend in two mutually-orthogonal directions are provided to form four liquid crystal domains in one pixel, in which the azimuthal angles of the directors representing the liquid crystal domains are 45° relative to the polarization axes (transmission axes) of a pair of polarizing plates in a crossed nicols arrangement. Assuming that the direction of the polarization axis of one of the polarizing plates is azimuthal angle 0° and that the counterclockwise direction is the positive direction, the azimuthal angles of the directors of the four liquid crystal domains are 45°, 135°, 225°, and 315°. Selection of these azimuthal angles of the directors is most preferable in respect of transmittance because linearly-polarized light in the direction of 45° relative to the polarization axis is not absorbed by the polarizing plates. Such a structure which includes four domains in one pixel is referred to as "four-division alignment structure" or simply "4D structure".

When slits (or ribs) are used as the alignment control means in the MVA mode liquid crystal display devices, the width of the slits need to be about 10 µm or more in order to obtain a sufficient alignment control force. If the slit width is narrower than this, sufficient alignment control force cannot be obtained. To form four domains, it is necessary to form in a counter electrode slits extending in directions different by 90° when seen in a direction normal to the substrate ("<"-shaped slit) and to form in a pixel electrode slits which are separated by a certain space from the counter electrode slits and which extend parallel to the counter electrode slits. Specifically, both the counter electrode and the pixel electrode in one pixel need to have a plurality of slits extending in the direction of 45°-225° and the direction of 135°-315° and having the width of about 10 µm.

However, when the above-described slits are employed, the ratio of the area of the slits to the pixel area increases, and accordingly, part of the pixel area which fails to contribute to display increases, so that the transmittance (brightness) significantly decreases. In the case of a small-size liquid crystal display device of finer definition, e.g., 2.4-inch VGA for use in mobile phones, the pixel pitch (row direction×vertical direction) is, for example, 25.5 µm×76.5 µm. In such a small pixel, the above-described slits cannot be formed.

In the CPA mode liquid crystal display devices, a rivet is formed of a resin or the like in the counter electrode at the pixel center, such that the rivet and a diagonal electric field produced at an edge of the pixel electrode serve to regulate the alignment of the liquid crystal. Provided in the respective gaps between the two polarizing plates and the liquid crystal layer are ¼-wave plates (quarter wave plates). By utilizing omniazimuthal, radial slope alignment domains and circular polarization, high transmittance (brightness) can be achieved.

The CPA mode which utilizes the ¼-wave plates achieves high transmittance but disadvantageously provides a low contrast ratio and a narrow viewing angle as compared with the MVA mode. Specifically, when the ¼-wave plates are used, the display (especially, the display at lower gray levels (lower brightness)) appears brighter, i.e., so-called "whitish dots" are conspicuous, when observed in a diagonal viewing angle than when observed in front of the display surface (when observed in a direction normal to the display surface (viewing angle 0°)).

To solve the above problems of the liquid crystal display device in the MVA mode and the CPA mode, liquid crystal display devices as disclosed in Patent Document 1, Patent Document 2, and Patent Document 3 have been proposed. In the liquid crystal display devices of these patent documents, the four-division alignment structure is realized by forming in the pixel electrodes a large number of narrow slits extending in the direction of 45°-225° and in the direction of 135°-315° (referred to as "fishbone pixel electrode") such that the liquid crystal is aligned parallel to the slits. In liquid crystal display devices which use such fishbone pixel electrodes, large slits or rivets are not formed in pixels, and linearly-polarized light is used without using ¼-wave plates. Therefore, display can be realized with high transmittance, high contrast ratio, and wide viewing angle.

Note that the liquid crystal display devices of these patent documents include alignment sustaining layers on surfaces of the upper and lower substrates on the liquid crystal layer side for making the liquid crystal have an appropriate pretilt angle during absence of voltage application to the liquid crystal. These alignment sustaining layers are formed by polymerizing monomers contained in the liquid crystal layer during application of a voltage to the liquid crystal.

[Patent Document 1] Japanese Laid-Open Patent Publication No. 2002-107730

[Patent Document 2] Japanese Laid-Open Patent Publication No. 2003-149647

[Patent Document 3] Japanese Laid-Open Patent Publication No. 2006-330638

The pixel electrodes of the liquid crystal display devices described in the aforementioned patent documents have a plurality of linear electrode portions (also referred to as "line portions") extending in the direction of 45°-22520 and the direction of 135°-315°. Abnormal alignment of the liquid crystal, or such a phenomenon that the liquid crystal alignment direction becomes unstable, can occur depending on the shape or size of the linear electrode portions or the shape or size of the plurality of slits extending parallel to the linear electrode portions (also referred to as "linear space portions"), resulting in the problems of variation in transmittance across the display surface, display unevenness, and abnormal gray scale.

The inventor of the present application conducted researches and found that, to meet severe display characteristic requirements for liquid crystal display devices in the future, it is necessary to increase the transmittance in each pixel and suppress the variation in transmittance among pixels in a display screen to be about 10% or lower. However, the shape and size of the linear electrode portions and slits which are optimum for achieving such high transmittance characteristics has not been researched. Also, the fishbone-type electrodes have not been researched as to what setting of the relationship between the width of the linear electrode portions and the width of the slits can achieve the best transmittance characteristics.

The present invention was conceived with the view of solving the above problems. One of the objects of the present invention is to provide a liquid crystal display device including fishbone-type electrodes of high display quality which has high transmittance and which has a reduced transmittance variation smaller than about 10% across the display surface.

A liquid crystal display device of the present invention is a vertical alignment type liquid crystal display device which has a plurality of pixels, including: a first electrode which includes, in each of the plurality of pixels, a plurality of first branch portions extending in a first direction and a plurality of second branch portions extending in a second direction that is different from the first direction; a second electrode disposed so as to oppose the first electrode; and a liquid crystal layer interposed between the first electrode and the second electrode, wherein a width of each of the plurality of first branch portions and the plurality of second branch portions is in a range not less than 1.4 µm and not more than 8.0 µm.

In one embodiment, any adjacent two of the plurality of first branch portions and any adjacent two of the plurality of second branch portions are separated by a space wider than 1.4 µm and narrower than 3.2 µm.

In one embodiment, when any adjacent two of the plurality of first branch portions and any adjacent two of the plurality of second branch portions are separated by a space wider than 1.4 µm and narrower than 2.1 µm, the width of each of the plurality of first branch portions and the plurality of second branch portions is in a range not less than 1.4 µm and not more than 3.5 µm.

In one embodiment, the width of each of the plurality of first branch portions and the plurality of second branch portions is in a range not less than 1.4 µm and not more than 5.0 µm.

In one embodiment, when any adjacent two of the plurality of first branch portions and any adjacent two of the plurality of second branch portions are separated by a space wider than 1.4 µm and narrower than 2.1 µm, the width of each of the plurality of first branch portions and the plurality of second branch portions is in a range not less than 1.4 µm and not more than 3.2 µm.

In one embodiment, the width of each of the plurality of first branch portions and the plurality of second branch portions is in a range not less than 1.4 µm and not more than 5.0 µm while any adjacent two of the plurality of first branch portions and any adjacent two of the plurality of second branch portions are separated by a space wider than 1.8 µm and narrower than 3.2 µm, or the width of each of the plurality of first branch portions and the plurality of second branch portions is in a range not less than 1.4 µm and not more than 3.2 µm while any adjacent two of the plurality of first branch portions and any adjacent two of the plurality of second branch portions are separated by a space wider than 1.4 µm and equal to or narrower than 1.8 µm.

In one embodiment, the width of each of the plurality of first branch portions and the plurality of second branch portions is in a range more than 2.1 µm and less than 2.8 µm while any adjacent two of the plurality of first branch portions and any adjacent two of the plurality of second branch portions are separated by a space wider than 2.1 µm and narrower than 2.8 µm.

In one embodiment, the first electrode includes a trunk portion, the plurality of first branch portions extend from the trunk portion in the first direction, and the plurality of second branch portions extend from the trunk portion in the second direction.

In one embodiment, the liquid crystal display device further includes a pair of polarizing plates which have transmission axes orthogonal to each other, wherein the first direction and the second direction are orthogonal to each other, and directions of the transmission axes of the pair of polarizing plates and the first direction are different by 45°, 135°, 225°, or 315°.

In one embodiment, each of the plurality of pixels includes a first region and a second region which are separated by a line parallel to or perpendicular to the directions of the transmission axes of the pair of polarizing plates, each of the first region and the second region includes the plurality of first branch portions and the plurality of second branch portions, each of the plurality of first branch portions in the first region has a first width, and each of the plurality of first branch portions in the second region has a second width that is different from the first width.

In one embodiment, each of the plurality of second branch portions in the first region has the first width, and each of the plurality of second branch portions in the second region has the second width.

In one embodiment, any adjacent two of the plurality of first branch portions in the first region are separated by a first space, and any adjacent two of the plurality of first branch portions in the second region are separated by a second space that is different from the first space.

In one embodiment, any adjacent two of the plurality of second branch portions in the first region are separated by the first space, and any adjacent two of the plurality of second branch portions in the second region are separated by the second space.

A liquid crystal display device of the present invention includes fishbone-type electrodes which have branch portions of the above-specified width or fishbone-type electrodes in which the space between adjacent branch portions has the above-specified value. Therefore, the abnormal alignment and alignment shift of the liquid crystal are suppressed so that the alignment direction of the liquid crystal in each pixel can be stabilized to be in a correct direction. Thus, high quality display with no roughness is possible in which the variation in transmittance across the display surface is smaller than about 10%.

In a liquid crystal display device of the present invention, one pixel includes two regions between which the widths of branch portions of the fishbone-type electrode or the spaces between adjacent branch portions are different. Therefore, the variation in brightness is suppressed, and high quality display with excellent gray scale and viewing angle characteristics is achieved.

BRIEF DESCRIPTION OF DRAWINGS

FIG. 8 A table showing the display quality evaluations by observers with line width L varying in the range of 1.4 μm to 8.0 μm and slit width S varying in the range of 1.4 μm to 5.0 μm.

FIG. 9 Plan view schematically showing the structure of one pixel in a liquid crystal display device of embodiment 2 of the present invention.

Figure 1:
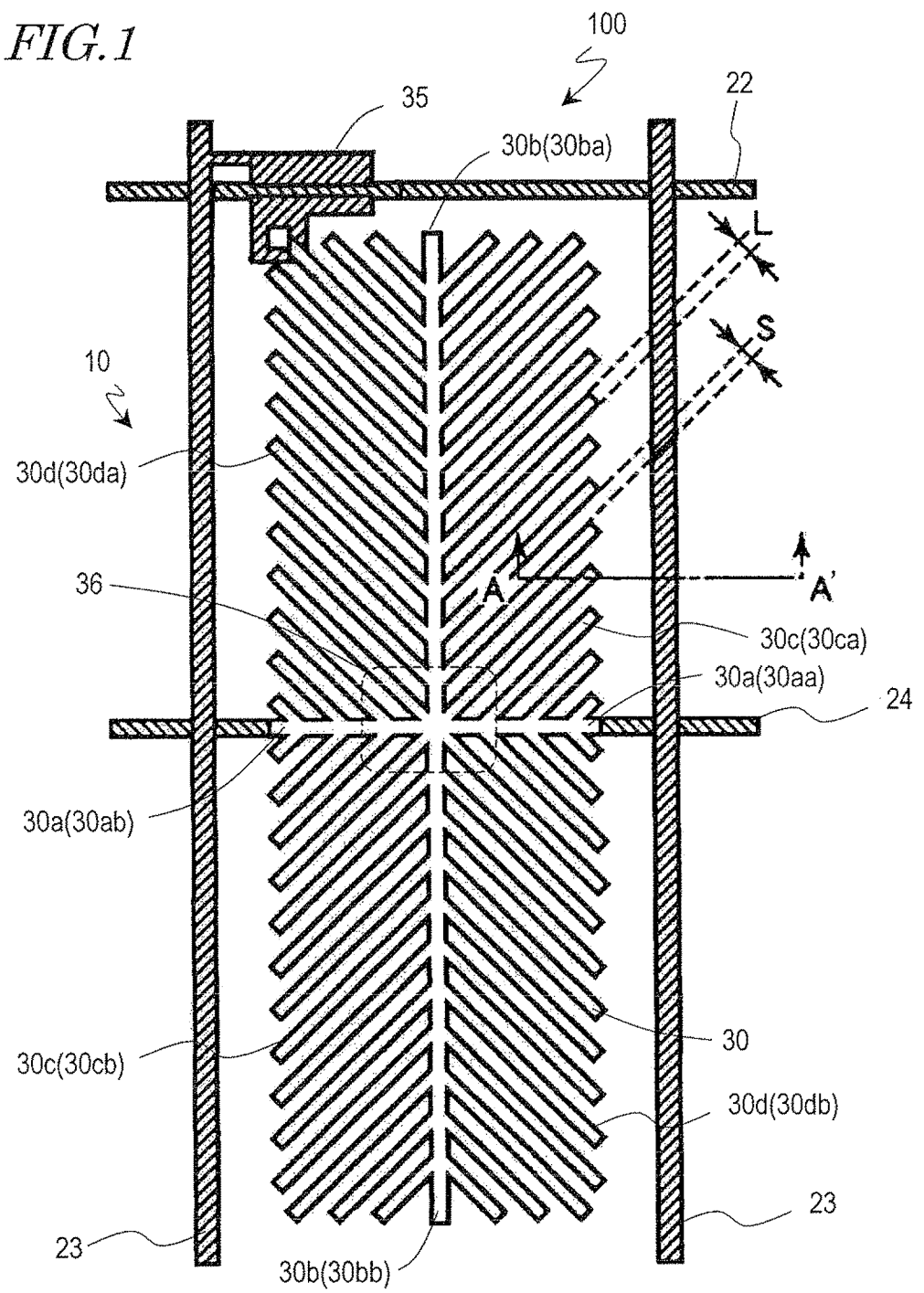
FIG. 1 Plan view schematically showing the structure of one pixel in a liquid crystal display device 100 of embodiment 1 of the present invention.

DESCRIPTION OF THE REFERENCE NUMERALS 10, 10' pixel
20 TFT substrate
21 glass substrate
22 scanning line
23 signal line
24 auxiliary capacitance line
25 insulation layer
30 pixel electrode
30a, 30b, 30aa, 30ab, 30ba, 30bb trunk portion
30c, 30d, 30ca, 30cb, 30da, 30db branch portion
32 alignment film
35 TFT
36 auxiliary capacitance electrode
40 counter substrate
41 transparent substrate
42 CF layer
43 common electrode
44 alignment film
50 liquid crystal layer
60a, 60b polarizing plate
90a, 90a', 90b, 90b' trunk portion
90c, 90c', 90d, 90d' branch portion
95 first region
95' second region
97 boundary line

DETAILED DESCRIPTION

Hereinafter, the structures of liquid crystal display devices of embodiments of the present invention are described with reference to the drawings, although the present invention is not limited to the embodiments described below.

Embodiment 1

Figure 2:
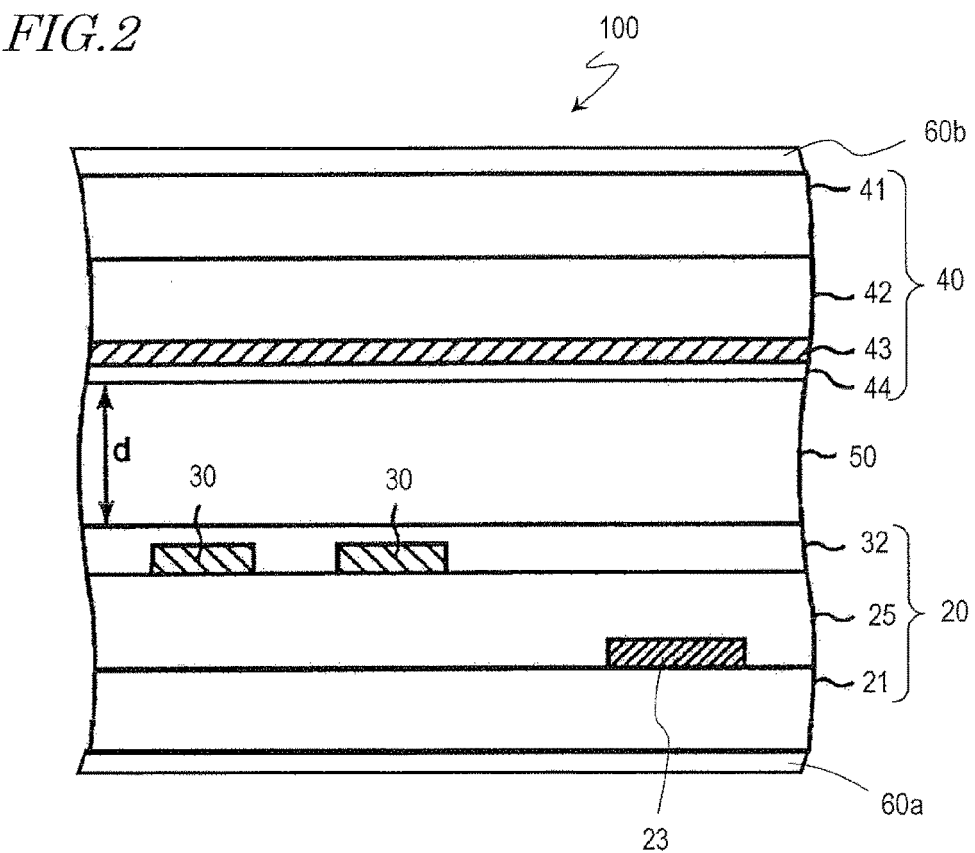
FIG. 2 A schematic cross-sectional view of the liquid crystal display device 100 taken along line A-A' of FIG. 1.

FIG. 1 is a plan view schematically showing a structure of one pixel of a liquid crystal display device 100 of embodiment 1 of the present invention. FIG. 2 is a schematic cross-sectional view of the liquid crystal display device 100 taken along line A-A' of FIG. 1.

The liquid crystal display device 100 is a vertical alignment type liquid crystal display device which includes a plurality of pixels 10 having the structure shown in FIG. 1 and which performs display in a normally-black mode using the pixels 10 arranged in a matrix. The liquid crystal display device 100 further includes, as shown in FIG. 2, a TFT substrate 20 which is an active matrix substrate, a counter substrate 40 which is a color filter substrate, and a liquid crystal layer 50 disposed between these substrates. The liquid crystal layer 50 includes nematic liquid crystal which has negative dielectric constant anisotropy ($\Delta\epsilon<0$).

The outer side of the TFT substrate 20 (opposite to the liquid crystal layer 50) is provided with a polarizing plate 60a. The outer side of the counter substrate 40 is provided with a polarizing plate 60b. The polarizing plates 60a and 60b are in a crossed nicols arrangement such that the light transmission axis of one of the polarizing plates extends in the horizontal direction of FIG. 1, and the light transmission axis of the other extends in the vertical direction. In the description below, the azimuthal direction from left to right in FIG. 1 is referred to as "azimuthal direction 0°", relative to which the azimuthal angles are allocated counterclockwise.

As shown in FIG. 1 and FIG. 2, the TFT substrate 20 includes a glass substrate (transparent substrate) 21, scanning lines (gate bus lines) 22, signal lines (data bus lines) 23 and auxiliary capacitance lines (Cs lines) 24 which are provided on the glass substrate 21, an insulation layer 25 which is provided over the lines, and pixel electrodes 30 and an alignment film 32 which are provided on the insulation layer 25.

Each of the pixels 10 is surrounded by two adjacent scanning lines 22 and two adjacent signal lines 23. Each pixel 10 includes a TFT 35 for switching a display voltage for the pixel electrode 30. The gate electrode and the source electrode of the TFT 35 are electrically connected to the scanning line 22 and the signal line 23, respectively, and the drain electrode is electrically connected to the pixel electrode 30. Provided under the pixel electrode 30 at the center of the pixel 10 is an auxiliary capacitance electrode 36 which is electrically connected to the auxiliary capacitance line 24.

The counter substrate 40 includes a transparent substrate 41, a CF (color filter) layer 42 provided on the transparent substrate 41 (on a surface of the transparent substrate on the liquid crystal layer side), a common electrode 43 provided on the CF layer 42, and an alignment film 44 provided on the common electrode 43.

The alignment film 32 of the TFT substrate 20 and the alignment film 44 of the counter substrate 40 both include an alignment layer and an alignment sustaining layer. The alignment layer is a vertical alignment film formed over the substrate by application. The alignment sustaining layer is formed, after the formation of liquid crystal cells, by photopolymerization of photopolymerizable monomers mixed in a liquid crystal material in advance with application of a voltage to the liquid crystal layer 50. During the polymerization of the monomers, a voltage is applied across the liquid crystal layer 50 by the pixel electrode 30 and the counter electrode 43. A diagonal electric field which occurs depending on the shape of the pixel electrode 30 causes liquid crystal molecules to align, and with the liquid crystal molecules being in that state, the monomers are irradiated with light to be polymerized.

Using the thus-formed alignment sustaining layer enables liquid crystal molecules to sustain (memorize) their alignment (azimuthal directions of pretilt) even after removal of the voltage (even in a state of no voltage application). The technique of forming such an alignment film is referred to as PSA (Polymer Sustained Alignment) technique. The details of this technique are described in Patent Documents 2 and 3. These patent documents are incorporated by reference in this specification. The detailed description of the alignment sustaining layer is herein omitted.

As shown in FIG. 1, the pixel electrode 30 includes a trunk portion 30a extending in the direction of azimuthal angle 0°-180°, a trunk portion 30b extending in the direction of azimuthal angle 90°-270°, a plurality of branch portions 30c (first branch portions) extending in the direction of azimuthal angle 45°-225° (first direction), and a plurality of branch portions 30d (second branch portions) extending in the direction of azimuthal angle 135°-315° (second direction).

The trunk portion 30a includes a trunk portion 30aa extending from the intersection of the trunk portion 30a and the trunk portion 30b which is near the center of the pixel 10 in the direction of azimuthal angle 0° and a trunk portion 30ab extending from the intersection in the direction of azimuthal angle 180°. The trunk portion 30b includes a trunk portion 30ba extending from the intersection in the direction of azimuthal angle 90° and a trunk portion 30bb extending from the intersection in the direction of azimuthal angle 270°.

The branch portions 30c include a plurality branch portions 30ca extending from the trunk portion 30aa or 30ba in the direction of azimuthal angle 45° and a plurality of branch portions 30cb extending from the trunk portion 30ab or 30bb in the direction of azimuthal angle 225°. The branch portions 30d include a plurality of branch portions 30da extending from the trunk portion 30ab or 30ba in the direction of azimuthal angle 135° and a plurality of branch portions 30db extending from the trunk portion 30aa or 30bb in the direction of azimuthal angle 315°.

The pixel electrode 30 which has the above-described shape and the alignment films 32 and 44 form a multidomain of 4D structure in one pixel 10. When no voltage is applied, the azimuthal directions of the pretilt of the liquid crystal molecules in the four domains are parallel to the branch portions 30ca, 30da, 30cb and 30db, respectively, depending on the directions memorized in the alignment films 32 and 44. When a voltage is applied, the liquid crystal molecules of the four domains are oriented in polar angle directions which are parallel to the branch portions 30ca, 30da, 30cb and 30db (the directions of the directors of the domains) and which are more parallel to the substrate surface. In this case, the azimuthal directions of the orientation are coincident with the pretilt directions, and therefore, the orientation in correct azimuthal directions with an extremely-high response rate is realized.

Next, the relationship of width L of the branch portions 30c and 30d of the pixel electrode 30 and the space between adjacent two of the branch portions 30c and 30d is described. The branch portions 30c and 30d have equal widths. Space S between any adjacent two of the branch portions 30c and space S between any adjacent two of the branch portions 30d are equal.

As shown in FIG. 1, width L of the branch portions 30c and 30d refers to the dimension perpendicular to the direction of elongation of the branch portions. Space S between any adjacent two of the branch portions 30c and 30d refers to the dimension of a gap (slit portion) formed between adjacent two branch portions which is perpendicular to the direction of elongation of the branch portions. Width L is sometimes referred to as "line width L". Space S is sometimes referred to as "slit width S".

The inventor of the present application estimated that, to meet severe display characteristic requirements for liquid crystal display devices in the future, it is necessary to prevent the variation in transmittance among pixels, which would be a cause of roughness in display, as well as the necessity of increasing the transmittance of the pixels. To this end, the inventor examined the optimum relationship between line width L and slit width S which is to be applied to the pixels 10. Hereinafter, the details of the examinations and the results obtained from the examinations are described. In liquid crystal display devices used in the examinations, the thickness of the liquid crystal layer 50 was 3.15 µm, and the pretilt angle of the liquid crystal molecules was 1.5° to 2.0°. The examinations were carried out with the gate voltage at 15 V and the source voltage at 4.4 V.

(Examination 1)

First, the relation of the transmittance of the pixels 10 to line width L and slit width S was examined. Note that, in this examination, the variation in transmittance among pixels was smallest when line width L was 2.5 µm and slit width S was 2.5 µm. Factor T employed in the examinations below represents the degree of the variation in transmittance of respective samples in percentages relative to the smallest transmittance variation (100%). The variation in transmittance is represented by the difference between the maximum transmittance and the minimum transmittance. Therefore, a larger T value indicates that the display is excellent with a smaller variation in transmittance.

Figure 3:
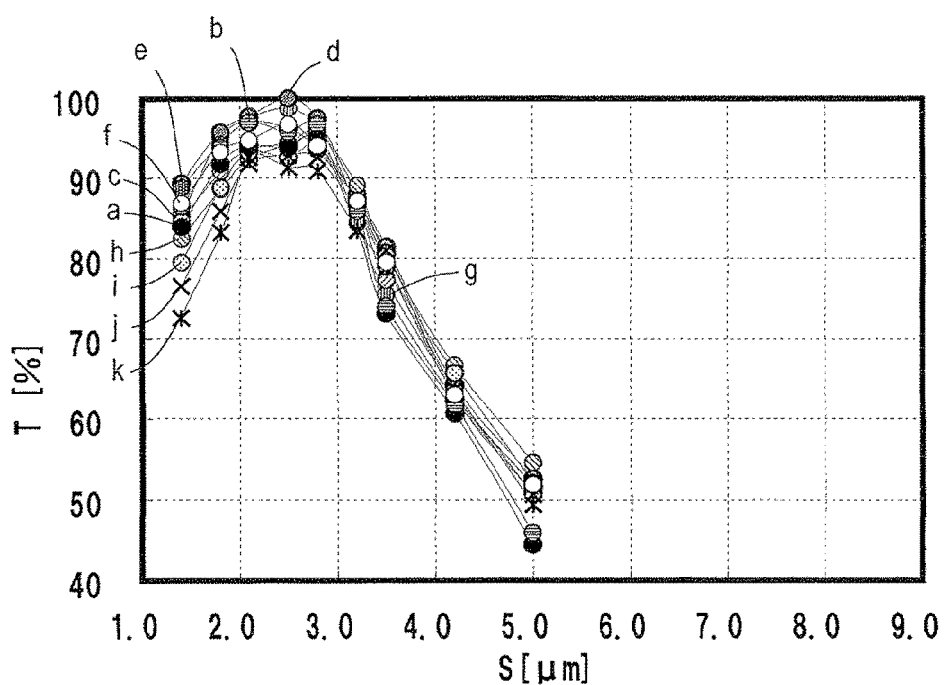
FIG. 3 Graphs representing the transmittance variation degree T with constant line width L and varying slit width S of a pixel electrode 30.

FIG. 3 shows graphs representing the transmittance variation degree T (also simply referred to as "T") with constant line width L and varying slit width S. Graphs a, b, c, d, e, f, g, h, j, and k in FIG. 3 represent the relationship between slit width S and T, with line width L fixed at 1.4 µm, 1.8 µm, 2.1 µm, 2.5 µm, 2.8 µm, 3.2 µm, 3.5 µm, 4.2 µm, 5.0 µm, 6.0 µm, and 8.0 µm, respectively. Slit width S was changed in the range of 1.4 µm to 5.0 µm.

As seen from FIG. 3, T of 90% or higher was achieved by selecting an appropriate value for slit width S no matter which value line width L was fixed (in any of cases a to k of FIG. 3). Therefore, there is a probability that a desired, high reflectance characteristic can be achieved so long as line width L is in a range not less than 1.4 µm and not more than 8.0 µm. In other words, there is a probability that excellent display with small transmittance differences is realized so long as the width of each of the branch portions 30c and 30d of the pixel electrode 30 is in a range not less than 1.4 µm and not more than 8.0 µm.

Figure 4:
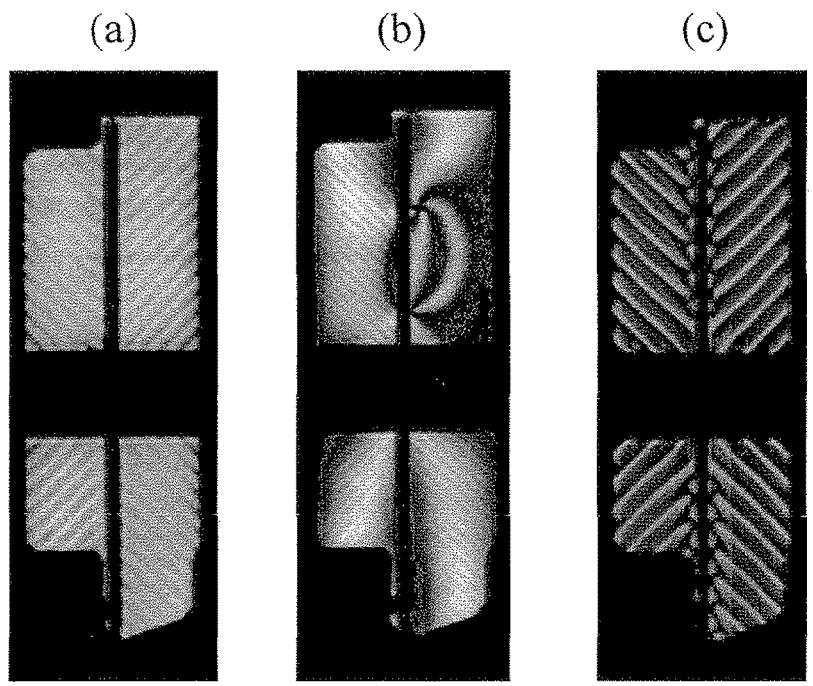
FIG. 4 Images showing the white display of a pixel 10. (a) shows a preferable display state achieved when both line width L and slit width S are 2.5 μm. (b) and (c) show unpreferable display states.

FIG. 4 shows the white display of the pixel 10. FIG. 4(a) shows a preferable display state achieved when both line width L and slit width S were 2.5 µm. FIG. 4(b) and FIG. 4(c) show unpreferable display states which are described below.

When slit width S was not more than 1.4 µm, the alignment control force produced by the slit portion decreased so that the alignment of the liquid crystal near the slit portion became unstable. Therefore, the transmittance became nonuniform as shown in FIG. 4(b) so that dark lines were generated. When slit width S was not less than 3.2 µm, the alignment control force could not be sufficiently exerted on all the liquid crystal molecules, so that abnormal alignment of the liquid crystal molecules occurred, and the transmittance decreased as shown in FIG. 4(c). Thus, it is desired that slit width S is more than 1.4 µm and less than 3.2 µm.

Figure 5:
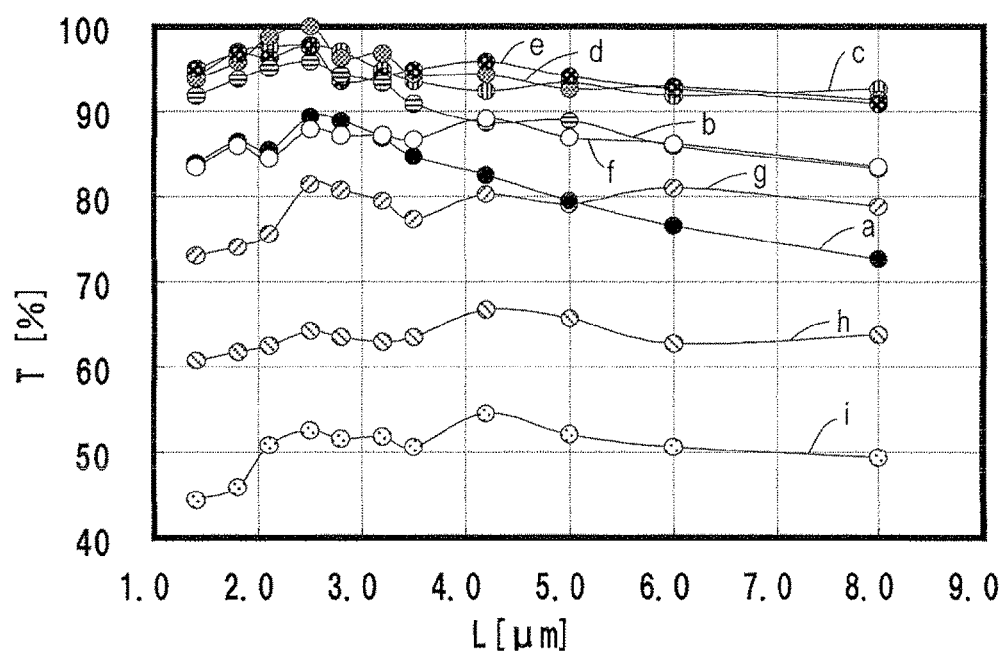
FIG. 5 Graphs representing transmittance T with constant slit width S and varying line width L of the pixel electrode 30.

FIG. 5 shows the graphs representing T with constant slit width S and varying line width L. Graphs a, b, c, d, e, f, g, h, and i in FIG. 5 represent the relationship between line width L and T, with slit width S fixed at 1.4 μm, 1.8 μm, 2.1 μm, 2.5 μm, 2.8 μm, 3.2 μm, 3.5 μm, 4.2 μm, and 5.0 μm, respectively. Line width L was changed in the range of 1.4 μm to 8.0 μm.

As seen from FIG. 5, the dependence of T on line width L was not so great. When slit width S was not less than 2.1 μm and not more than 2.8 μm (corresponding to c, d, and e in FIG. 5), T was 90% or higher irrespective of the value of line width L. When slit width S was 1.4 μm or not less than 3.2 μm (corresponding to a, g, h, and i), T did not exceed 90% irrespective of the value of line width L. When slit width S was 1.8 μm (corresponding to b), T exceeded 90% so long as line width L was not less than 1.4 μm and not more than 3.5 μm.

Thus, to obtain desirable display with a small brightness variation, the pixel electrode need to be configured such that line width L is not less than 1.4 μm and not more than 8.0 μm, and slit width S is at least more than 1.4 μm and less than 3.2 μm. In other words, any adjacent two of the plurality of branch portions 30c of the pixel electrode 30 and any adjacent two of the plurality of branch portions 30d need to be separated by a space wider than 1.4 μm and narrower than 3.2 μm.

Figures 6, 7:
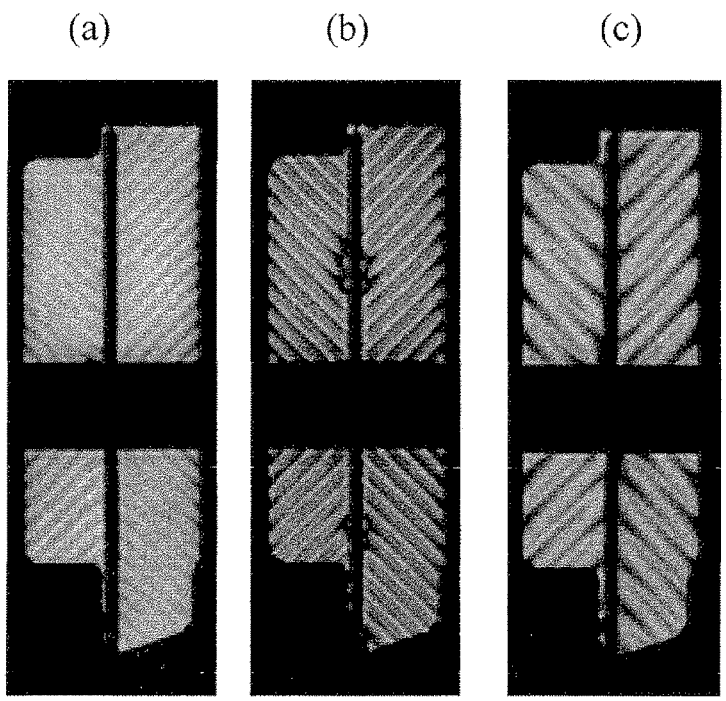
FIG. 6 Images showing the white display of the pixel 10. (a) shows a preferable display state achieved when both line width L and slit width S are 2.5 μm. (b) and (c) show unpreferable display states.
FIG. 7 A table of the numerical representations of the transmittance variation degree T shown in FIG. 3 and FIG. 5, showing all the values for the transmittance variation degree T which result from the combinations of line width L and slit width S.

FIG. 6 shows the white display of the pixels 10.

FIG. 6(a) shows a preferable display state achieved when both line width L and slit width S were 2.5 μm. FIG. 6(b) and FIG. 6(c) show unpreferable display states which are described below.

When line width L was less than 1.4 μm and slit width S was not more than 3.2 μm, the alignment control force produced by the slit portion was greater than the alignment control force produced by the line portion (trunk portion), so that abnormal alignment of the liquid crystal occurred, and the transmittance decreased as shown in FIG. 6(b). When line width L was more than 8.0 μm and slit width S was not more than 3.2 μm, the alignment control force produced by the line portion was greater than the alignment control force produced by the slit portion, so that abnormal alignment of the liquid crystal occurred, and the transmittance became nonuniform and decreased as shown in FIG. 6(c). Thus, line width L was preferably set to be not less than 1.4 μm and not more than 8.0 μm.

FIG. 7 is a table of the numerical representations of the transmittance variation degree T shown in FIG. 3 and FIG. 5, showing all the values for T which resulted from the combinations of line width L and slit width S.

As seen from FIG. 7, when slit width S was more than 1.4 μm and less than 2.1 μm while line width L was not less than 1.4 μm and not more than 3.5 μm, or when slit width S was more than 1.8 μm and less than 3.2 μm while line width L was not less than 1.4 μm and not more than 8.0 μm, T was about 90% or higher. In other words, a desirable high transmittance was obtained when any adjacent two of the plurality of branch portions 30c of the pixel electrode 30 and any adjacent two of the plurality of branch portions 30d were separated by a space wider than 1.4 μm and narrower than 2.1 μm while width L of the branch portions 30c and the branch portions 30d was not less than 1.4 μm and not more than 3.5 μm, or when any adjacent two of the plurality of branch portions 30c and any adjacent two of the plurality of branch portions 30d were separated by a space wider than 1.8 μm and narrower than 3.2 μm while width L of the branch portions 30c and the branch portions 30d was not less than 1.4 μm and not more than 8.0 μm.

Note that T of 90% or higher is ensured by configuring the pixel electrode such that slit width S is not less than 1.8 μm and not more than 2.1 μm while line width is not less than 1.4 μm and not more than 3.5 μm, or such that slit width S is not less than 2.1 μm and not more than 2.8 μm while line width L is not less than 1.4 μm and not more than 8.0 μm.

(Examination 2)

Next, the relation of the combination of line width L and slit width S to the display quality (degree of roughness) was examined based on the evaluations by viewer's visual observation.

FIG. 8 is a table which shows the display quality evaluations by observers with line width L varying in the range of 1.4 μm to 8.0 μm and slit width S varying in the range of 1.4 um to 5.0 μm. In the table, "○" means that the display quality was at a satisfactory level, and "×(*)" and "××(*)" mean that the display quality was insufficient for a desired level. More specifically, "○" means that no variation in pixel transmittance occurred across the entire display screen so that no roughness was observed in display. "×(*)" means that transmittance abnormality occurred in about 10 out of 100 pixels so that roughness was observed. "××(*)" means that transmittance abnormality occurred in substantially all of the pixels so that terrible roughness was observed.

Conceivable causes of occurrence of roughness are explained as follows. When slit width S is far less than line width L, the alignment control force is insufficient near the slit portion so that the alignment of some liquid crystal molecules in the pixel becomes unfixed. When slit width S exceeds a certain value, the alignment control force is not sufficiently exerted on the liquid crystal molecules near the center of the slit portion so that the alignment of these liquid crystal molecules becomes unstable (see FIGS. 4(b) and 4(c) and FIGS. 6(b) and 6(c)).

As appreciated from FIG. 8, there is a probability that excellent display quality with no occurrence of roughness can be obtained when slit width S is more than 1.4 μm and less than 3.2 μm so long as line width L is in a range not less than 1.4 μm and not more than 5.0 μm. In other words, excellent display quality can be obtained when any adjacent two of the branch portions 30c and any adjacent two of the branch portions 30d are separated by a space wider than 1.4 μm and narrower than 3.2 μm so long as the width of each of the branch portions 30c and 30d is in a range not less than 1.4 μm and not more than 5.0 μm.

Excellent display quality can also be obtained when slit width S is more than 1.4 μm and less than 2.1 μm while line width L is in a range not less than 1.4 μm and not more than 3.2 μm, or when slit width S is not less than 2.1 μm and less than 3.2 μm while line width L is not less than 1.4 μm and not more than 5.0 μm. In other words, excellent display quality can be obtained when any adjacent two of the branch portions 30c and any adjacent two of the branch portions 30d are separated by a space wider than 1.4 μm and narrower than 2.1 μm while the width of each of the branch portions 30c and 30d is not less than 1.4 μm and not more than 3.2 μm, or when any adjacent two of the branch portions 30c and any adjacent two of the branch portions 30d are separated by a space equal to or wider than 2.1 μm and narrower than 3.2 μm while the width of each of the branch portions 30c and 30d is in a range not less than 1.4 μm and not more than 5.0 μm.

Also, excellent display quality is ensured so long as slit width S is not less than 1.8 μm and less than 2.1 μm while line width L is not less than 1.4 μm and not more than 3.2 μm, or when slit width S is not less than 2.1 μm and not more than 2.8 μm while line width L is not less than 1.4 μm and not more than 5.0 μm. In other words, excellent display quality can be ensured when any adjacent two of the branch portions 30c and any adjacent two of the branch portions 30d are separated by a space equal to or wider than 1.8 μm and narrower than 2.1 μm while the width of each of the branch portions 30c and 30d is in a range not less than 1.4 μm and not more than 3.2 μm, or when any adjacent two of the branch portions 30c and any adjacent two of the branch portions 30d are separated by a space equal to or wider than 2.1 μm and equal to or narrower than 2.8 μm while the width of each of the branch portions 30c and 30d is in a range not less than 1.4 μm and not more than 5.0 μm.

(Conclusion)

In consideration of the results of examinations 1 and 2, the optimum combinations of line width L and slit width S with which the variation in transmittance is sufficiently suppressed and roughness in display does not occur are shown below.

(1) Line width L is in a range not less than 1.4 μm and not more than 5.0 μm, and slit width S is more than 1.8 μm and less than 3.2 μm. In other words, the width of each of the branch portions 30c and 30d is in a range not less than 1.4 μm and not more than 5.0 μm, and any adjacent two of the branch portions 30c and any adjacent two of the branch portions 30d are separated by a space wider than 1.8 μm and narrower than 3.2 μm.

(2) Line width L is in a range not less than 1.4 μm and not more than 3.2 μm, and slit width S is more than 1.4 μm and not more than 1.8 μm. In other words, the width of each of the branch portions 30c and 30d is in a range not less than 1.4 μm and not more than 3.2 μm, and any adjacent two of the branch portions 30c and any adjacent two of the branch portions 30d are separated by a space wider than 1.4 μm and equal to or narrower than 1.8 μm.

It is appreciated from the results of examination 1, the combination of line width L and slit width S which achieves the most excellent display (T=100%) is such that both line width L and slit width S are more than 2.1 μm and less than 2.8 μm. It is also appreciated from examination 2 that, in this case, excellent display quality with no roughness can be obtained. Thus, the most preferable display characteristics can be obtained so long as both line width L and slit width S are within this range. In other words, the best display characteristics can be obtained so long as the width of each of the branch portions 30c and 30d is in a range more than 2.1 μm and less than 2.8 μm while any adjacent two of the branch portions 30c and any adjacent two of the branch portions 30d are separated by a space wider than 2.1 μm and narrower than 2.8 μm.

Note that the shape of the pixel electrode 30 of embodiment 1 may be applied to the shape of the counter electrode within one pixel area. With such a counter electrode shape, equivalent effects to those described above can be obtained.

Embodiment 2

Hereinafter, a liquid crystal display device embodiment 2 of the present invention is described. The liquid crystal display device of embodiment 2 is different from the liquid crystal display device of embodiment 1 in that the pixel electrode 30 of embodiment 1 is replaced by a pixel electrode of a different fishbone shape, and the other elements are the same as those of embodiment 1. Therefore, only the pixel electrode is described below.

FIG. 9 is a plan view schematically showing the structure of a pixel electrode 90 in one of a plurality of pixels arranged in the liquid crystal display device of embodiment 2 (pixel 10').

As shown in FIG. 9, the pixel electrode 90 includes trunk portions 90a and 90a' extending in the direction of azimuthal angle 0°-180°, trunk portions 90b and 90b' extending in the direction of azimuthal angle 90°-270°, a plurality of branch portions 90c and 90c' (first branch portions) extending in the direction of azimuthal angle 45°-225° (first direction), and a plurality of branch portions 90d and 90d' (second branch portions) extending in the direction of azimuthal angle 135°-315° (second direction). The branch portions 90c and the branch portions 90d branches off from the trunk portion 90a or the trunk portion 90b. The branch portions 90c' and the branch portions 90d' branches off from the trunk portion 90a' or the trunk portion 90b'.

The pixel 10' includes a first region 95 and a second region 95' which are separated by a virtual boundary line 97 extending in the direction of azimuthal angle 0°-180°. In other words, the first region 95 and the second region 95' are separated by a line (boundary line 97) which is parallel or perpendicular to the mutually-orthogonal transmission axes of the two polarizing plates 60a and '60b shown in FIG. 2.

The first region 95 includes the trunk portions 90a and 90b and the branch portions 90c and 90d. The second region 95' includes the trunk portions 90a' and 90b' and the branch portions 90c' and 90d'. In the first region 95, widths L1 (first line widths) of the branch portions 90c and 90d are all equal. In the second region 95', widths L2 (second line widths) of the branch portions 90c' and 90d' are all equal. Note that width L1 and width L2 are different.

in the first region 95, any adjacent two of the branch portions 90c are separated by space S1 (first slit width), and any adjacent two of the branch portions 90d are also separated by space S1. In the second region 95', any adjacent two of the branch portions 90c' are separated by space S2 (second slit width) that is different from space S1, and any adjacent two of the branch portions 90d' are also separated by space S2.

The pixel electrode 90 having the above-described structure realizes a multidomain of 4D structure in each of the first region 95 and the second region 95'. Width L1 and width L2 are both set within the preferable range of width L which has been previously described in embodiment 1. Space S1 and space S2 are both set within the preferable range of space S which has been previously described in embodiment 1.

Since width L1 and width L2 are different and space S1 and space S2 are different, there is a small difference of the liquid crystal alignment control force between the first region and the second region. However, these widths and spaces are all within the ranges examined in embodiment and therefore, the liquid crystal display device of embodiment 2 provides equivalent effects to those described in embodiment 1. The liquid crystal display device of embodiment 2 further provides the effects described below.

Now, consider the relationship between the voltage supplied to the pixel electrode and the transmittance. The voltage dependence of the transmittance (referred to as "T-V characteristic") varies according to the shape of the pixel electrode. Therefore, the first region 95 and the second region 95' acquire two different T-V characteristics, and the one whole pixel 10' acquires the average of the two T-V characteristics.

In general, the T-V characteristic achieved by a pixel electrode having a specific shape is different from an ideal T-V characteristic, and therefore, defects such as whitish or blackish dots can occur in display. Also, the viewing angle dependence of the T-V characteristic varies according to the pixel shape, and therefore, it is probable that a pixel electrode having some specific shape cannot achieve a desired viewing angle characteristic.

In the liquid crystal display device of embodiment 2, one pixel can acquire two different T-V characteristics and perform display according to the average of these T-V characteristics. Therefore, more ideal gray scale and viewing angle characteristics can be obtained by appropriate combination of the pixel electrode shapes of the first region and the second region, in other words, by appropriate setting of width L1, width L2, space S1, and space S2.

A conceivable variation of the pixel electrode 90 includes, in the first region or the second region, trunk portions of two different widths, width L1 and width L2, and slit portions of two different spaces, space S1 and space S2. In this case, the trunk portions of two widths and the slit portions of two spaces exist adjacent to each other, so that the probability of abnormal alignment of the liquid crystal increases at the boundary between them. Thus, the two types of branch portions and the two types of slit portions should be in different regions as described in embodiment 2.

As is the case with embodiment 1, the shape of the pixel electrode 10' of embodiment 2 may be applied to the shape of the counter electrode within one pixel area. In this case also, equivalent effects to those described above can be obtained.

INDUSTRIAL APPLICABILITY

The present invention is preferably used in liquid crystal display devices of which high display quality is required.

The invention claimed is:

1. A vertical alignment type liquid crystal display device which has a plurality of pixels, comprising:
   a first electrode which includes, in each of the plurality of pixels, a plurality of first branch portions extending in a first direction and a plurality of second branch portions extending in a second direction that is different from the first direction;
   a second electrode disposed so as to oppose the first electrode;
   a liquid crystal layer interposed between the first electrode and the second electrode,
   wherein a width of each of the plurality of first branch portions and the plurality of second branch portions is in a range not less than 1.4 μm and not more than 8.0 μm; and
   first and second polarizers which have respective transmission axes substantially orthogonal to each other, wherein each of the plurality of pixels includes a first region and a second region which are separated by a line parallel to or perpendicular to a direction of the transmission axis of at least one of the polarizers, wherein each of the first region and the second region includes the first branch portions and the second branch portions, wherein all first branch portions in the first region have a first width and all first branch portions in the second region have a second width that is different from the first width.

2. The liquid crystal display device of claim 1, wherein any adjacent two of the plurality of first branch portions and any adjacent two of the plurality of second branch portions are separated by a space wider than 1.4 μm and narrower than 3.2 μm.

3. The liquid crystal display device of claim 2, wherein when any adjacent two of the plurality of first branch portions and any adjacent two of the plurality of second branch portions are separated by a space wider than 1.4 μm and narrower than 2.1 μm, the width of each of the plurality of first branch portions and the plurality of second branch portions is in a range not less than 1.4 μm and not more than 3.5 μm.

4. The liquid crystal display device of claim 2, wherein the width of each of the plurality of first branch portions and the plurality of second branch portions is in a range not less than 1.4 μm and not more than 5.0 μm.

5. The liquid crystal display device of claim 4, wherein when any adjacent two of the plurality of first branch portions and any adjacent two of the plurality of second branch portions are separated by a space wider than 1.4 μm and narrower than 2.1 μm, the width of each of the plurality of first branch portions and the plurality of second branch portions is in a range not less than 1.4 μm and not more than 3.2 μm.

6. The liquid crystal display device of claim 1, wherein
   the width of each of the plurality of first branch portions and the plurality of second branch portions is in a range not less than 1.4 μm and not more than 5.0 μm while any adjacent two of the plurality of first branch portions and any adjacent two of the plurality of second branch portions are separated by a space wider than 1.8 μm and narrower than 3.2 μm, or
   the width of each of the plurality of first branch portions and the plurality of second branch portions is in a range not less than 1.4 μm and not more than 3.2 μm while any adjacent two of the plurality of first branch portions and any adjacent two of the plurality of second branch portions are separated by a space wider than 1.4 μm and equal to or narrower than 1.8 μm.

7. The liquid crystal display device of claim 1, wherein the width of each of the plurality of first branch portions and the plurality of second branch portions is in a range more than 2.1 μm and less than 2.8 μm while any adjacent two of the plurality of first branch portions and any adjacent two of the plurality of second branch portions are separated by a space wider than 2.1 μm and narrower than 2.8 μm.

8. The liquid crystal display device of claim 1, wherein
   the first electrode includes a trunk portion,
   the plurality of first branch portions extend from the trunk portion in the first direction, and
   the plurality of second branch portions extend from the trunk portion in the second direction.

9. The liquid crystal display device of claim 1, wherein the first direction and the second direction are orthogonal to each other, and directions of the transmission axes of the first and second polarizers and the first direction are different by 45°, 135°, 225°, or 315°.

10. The liquid crystal display device of claim 1, wherein
    each of the plurality of second branch portions in the first region has the first width, and
    each of the plurality of second branch portions in the second region has the second width.

11. The liquid crystal display device of claim 1, wherein
    any adjacent two of the plurality of first branch portions in the first region are separated by a first space, and
    any adjacent two of the plurality of first branch portions in the second region are separated by a second space that is different from the first space.

12. The liquid crystal display device of claim 11, wherein
    any adjacent two of the plurality of second branch portions in the first region are separated by the first space, and
    any adjacent two of the plurality of second branch portions in the second region are separated by the second space.

* * * * *